United States Patent
Maro

(10) Patent No.: US 10,920,805 B2
(45) Date of Patent: Feb. 16, 2021

(54) SYSTEM AND METHOD FOR DETECTING A CONNECTOR FAILURE IN AN AGRICULTURAL APPARATUS

(71) Applicant: Deere & Company, Moline, IL (US)

(72) Inventor: Randall A. Maro, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 98 days.

(21) Appl. No.: 16/164,168

(22) Filed: Oct. 18, 2018

(65) Prior Publication Data

US 2019/0128293 A1 May 2, 2019

Related U.S. Application Data

(60) Provisional application No. 62/579,846, filed on Oct. 31, 2017.

(51) Int. Cl.
| | | |
|---|---|---|
| F15B 20/00 | (2006.01) | |
| F15B 19/00 | (2006.01) | |
| A01B 59/00 | (2006.01) | |
| A01B 76/00 | (2006.01) | |

(52) U.S. Cl.
CPC ............ *F15B 20/005* (2013.01); *A01B 59/00* (2013.01); *F15B 19/005* (2013.01); *A01B 76/00* (2013.01)

(58) Field of Classification Search
CPC ....... F15B 20/005; F15B 19/005; G01M 3/28; G01M 3/2815; G01F 1/36
See application file for complete search history.

(56) References Cited

U.S. PATENT DOCUMENTS

| | | | |
|---|---|---|---|
| 1,825,013 A | | 9/1931 | Patton |
| 4,232,546 A | * | 11/1980 | Dumont .................... F17D 3/00 165/11.1 |
| 4,770,317 A | | 9/1988 | Podgers et al. |
| 6,443,180 B1 | | 9/2002 | Samuelson et al. |
| 7,347,083 B2 | | 3/2008 | Beiderman et al. |
| 7,661,410 B1 | | 2/2010 | Fuelberth et al. |
| 8,950,242 B1 | * | 2/2015 | Dull .................... G01M 3/2815 73/40 |

(Continued)

FOREIGN PATENT DOCUMENTS

| | | |
|---|---|---|
| DE | 4337521 A1 | 5/1995 |
| DE | 10312087 A1 | 10/2004 |

(Continued)

OTHER PUBLICATIONS

German Search Report issued in counterpart application No. 102018218640.5 dated Nov. 22, 2019. (12 pages).

*Primary Examiner* — Hongmin Fan

(57) ABSTRACT

A system for detecting a connector failure associated with an agricultural apparatus is disclosed. The system comprises a first supply source that is configured to supply a quantity of air at a first pressure into the hydraulic fluid line arranged on the agricultural apparatus. A second supply source is configured to supply a quantity hydraulic fluid to the hydraulic fluid line at a second pressure that is less than the first pressure. A protection device is coupled to the hydraulic fluid line and is configured to inhibit flow of the hydraulic fluid supplied by the second supply source when a pressure differential across an inlet of the protection device exceeds a predetermined threshold.

20 Claims, 4 Drawing Sheets

(56) References Cited

U.S. PATENT DOCUMENTS

2005/0109082 A1* 5/2005 Stewart .................. G01M 3/26
                                                          73/40
2008/0035215 A1 2/2008 Loper

FOREIGN PATENT DOCUMENTS

| DE | 102008060253 A1 | 7/2010 |
| DE | 102012010055 A1 | 9/2013 |
| DE | 102017104804 A1 | 9/2018 |
| DE | 102017223790 A1 | 6/2019 |

* cited by examiner

SYSTEM AND METHOD FOR DETECTING A CONNECTOR FAILURE IN AN AGRICULTURAL APPARATUS

RELATED APPLICATIONS

This application claims priority to U.S. Provisional Application No. 62/579,846, titled "System and Method for Detecting a Connector Failure," filed Oct. 31, 2017, which is hereby incorporated by reference in its entirety.

FIELD OF THE DISCLOSURE

The present disclosure relates generally to failure detection systems and, more particularly, to a system and method for detecting a connector failure arranged in a hydraulic fluid line of an agricultural apparatus.

BACKGROUND OF THE DISCLOSURE

The detection of connection failures in hydraulic systems has become increasing difficult. Some conventional approaches employ the use of standard shop air to test whether connections are fully seated. Drawbacks to such approaches, however, include poor sensing and detection capabilities to ensure connections are fully made. This in turn can result in large oil leakages, as well as system failures. As such, there is a need in the art for an improved detection system to address such concerns.

SUMMARY OF THE DISCLOSURE

According to an aspect of the present disclosure, a system for detecting a connector failure associated with an agricultural apparatus is disclosed. The system comprises a first supply source that is configured to supply a quantity of air at a first pressure into the hydraulic fluid line arranged on the agricultural apparatus. A second supply source is configured to supply a quantity hydraulic fluid to the hydraulic fluid line at a second pressure that is less than the first pressure. A protection device is coupled to the hydraulic fluid line and is configured to inhibit flow of the hydraulic fluid supplied by the second supply source when a pressure differential across an inlet of the protection device exceeds a predetermined threshold.

According to a second aspect of the present disclosure, an agricultural vehicle for detecting a connector failure is disclose. In some embodiments, the agricultural vehicle can comprise a vehicle frame supported by a plurality of ground engaging units and an agricultural implement coupled to the vehicle frame. A first supply source is configured to supply a quantity of air at a first pressure into a hydraulic fluid line arranged on at least one of the vehicle frame or the agricultural implement. A second supply source is configured to supply a quantity hydraulic fluid to the hydraulic fluid line at a second pressure that is less than the first pressure. A monitoring device is coupled to the hydraulic fluid line and is configured to monitor the second pressure. An electronic control unit communicatively coupled the monitoring device, wherein the electronic control unit is configured to generate operator alert when the second pressure exceeds a predetermined threshold.

According to a third aspect of the present disclosure, a method for detecting a connector failure in an agricultural apparatus is disclosed. The method comprises introducing a first medium to a hydraulic fluid line at a first predetermined pressure; introducing a second medium to a hydraulic fluid line at a second predetermined pressure that is less than the first predetermined pressure; monitoring a pressure of the hydraulic fluid line as the hydraulic fluid is introduced at the second predetermined pressure; and actuating a protection device arranged in the hydraulic fluid line to inhibit flow of the hydraulic fluid when a pressure differential across an inlet of the protection device exceeds a predetermined threshold.

Other features and aspects will become apparent by consideration of the detailed description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION OF THE DRAWINGS

Figure 1:
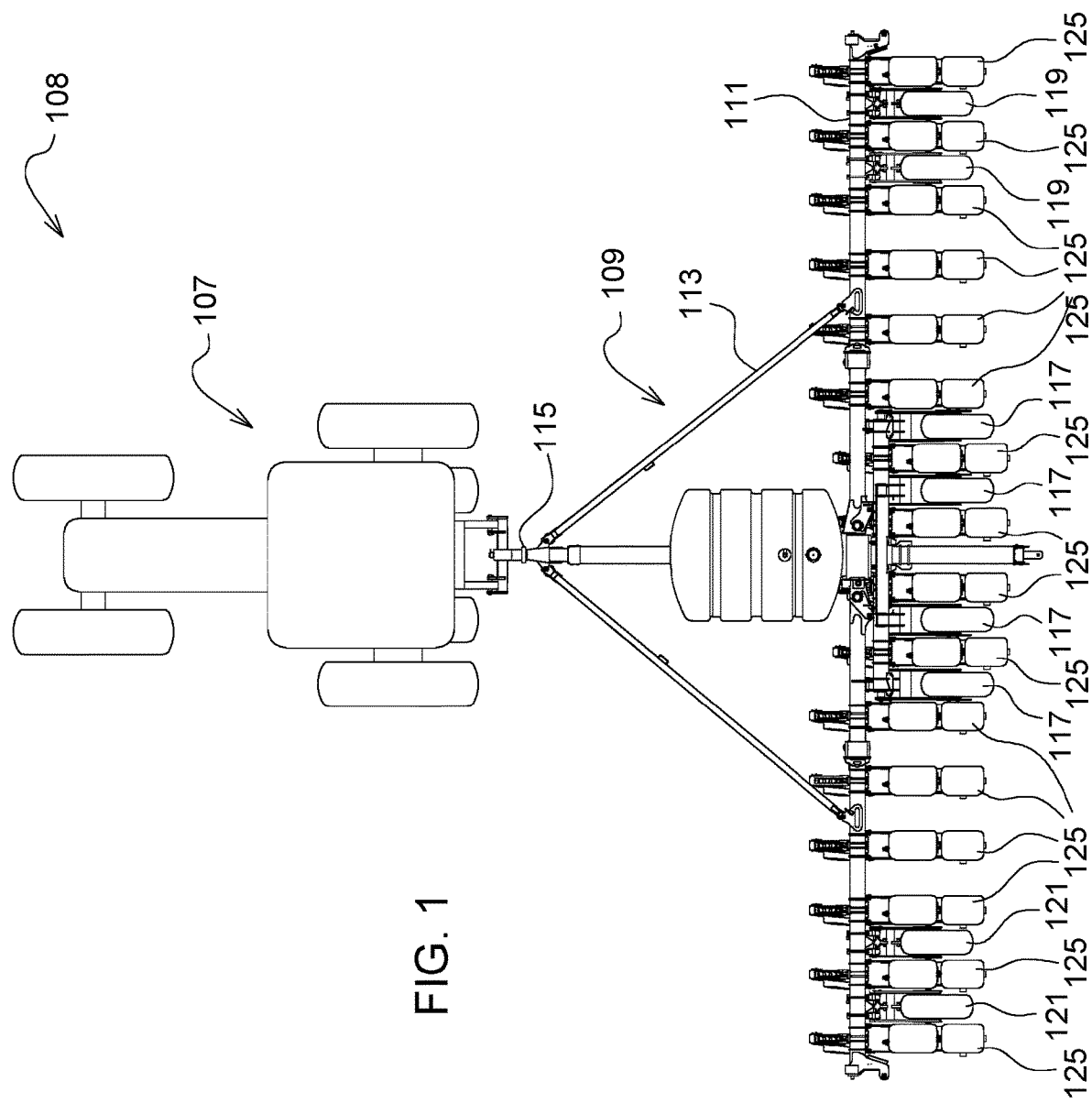
FIG. 1 is a top view of an agricultural apparatus according to an embodiment.
Figure 2:
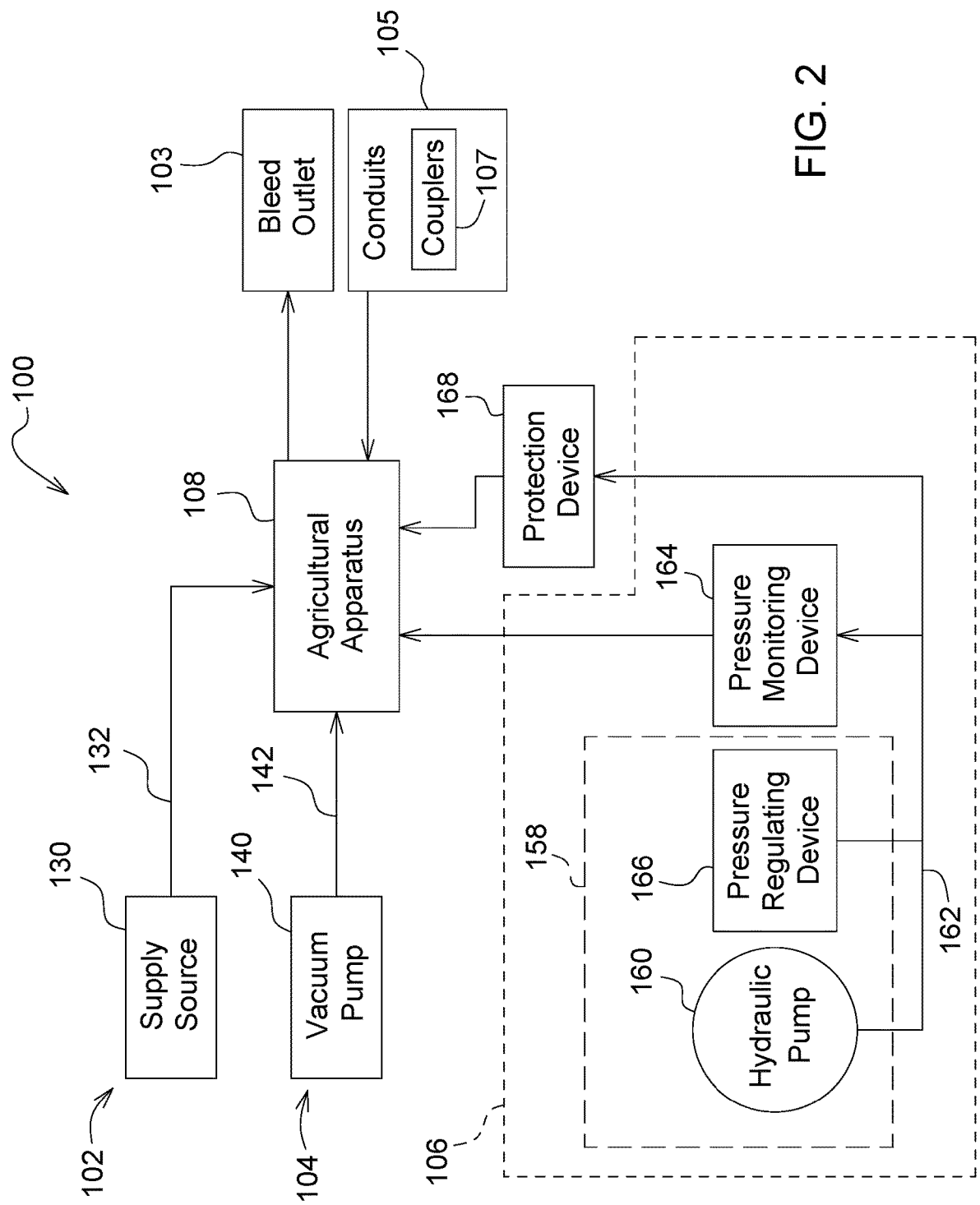
FIG. 2 is a block diagram of a system for detecting a connector failure according to an embodiment.
Figure 3:
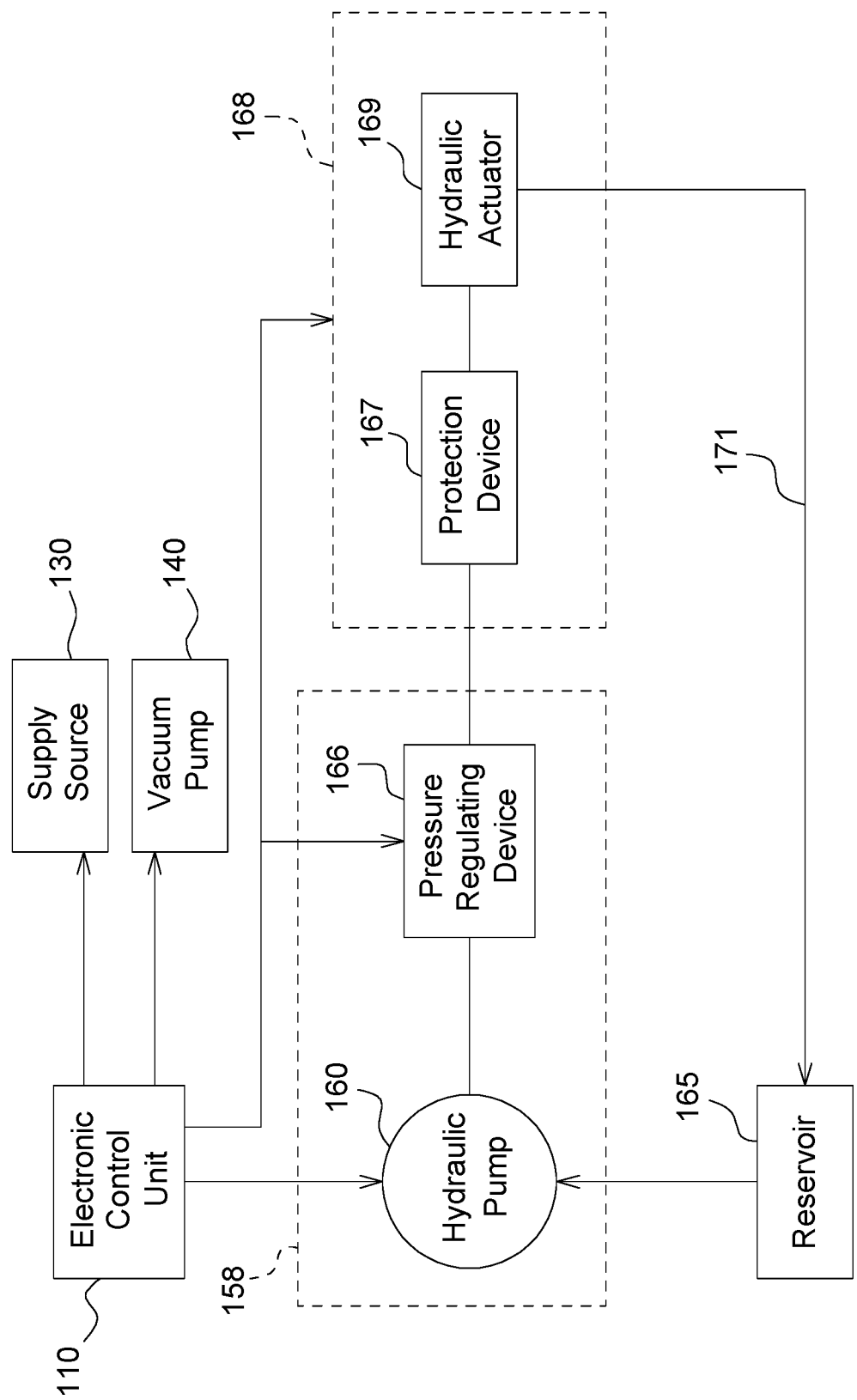
FIG. 3 is a block diagram of a control system used in the system of FIG. 2 for detecting a connector failure according to an embodiment.

Referring to FIGS. 1-3, a system 100 for detecting a connector failure associated with a hydraulic fluid line is shown according to an embodiment. Although in embodiments herein, the system 100 is shown as being associated with an agricultural apparatus 108, it should be noted that embodiments of the present disclosure may be useful in various hydraulic systems. With reference to FIG. 1, the agricultural apparatus 108 can include an agricultural vehicle 107 that is arranged to tow an agricultural implement 109 (e.g., a row crop planter). The agricultural implement 109 includes a tool bar 111 as part of an implement frame 113. The implement frame 113 includes a tongue 115 by which the planter is coupled to the agricultural vehicle 107. Supporting the implement frame 113 are three sets of ground engaging wheels. The center set has four wheels 117 while a left set has two wheels 121 and the right set has two wheels 119. Mounted to the tool bar 111 are multiple planting row units 125.

In some embodiments, the system 100 can comprise an air system 100, a hydraulic circuit 106, and a protection circuit 168 having a protection device 167 communicatively coupled to an electronic control unit 110. For example, the hydraulic circuit 106 and the air system 100 can be arranged to supply a medium such as air or pressurized hydraulic fluid (e.g., hydraulic oil) via one or more supply lines to a plurality of conduits 105 arranged on or proximate the agricultural apparatus 108. For example, the hydraulic circuit 106 can be arranged to supply fluid to one or more lift cylinders (not shown), which are operable to facilitate raising and lowering of the implement frame 113. In some embodiments, each of the plurality of conduits 105 (e.g., pipes and hoses) can comprise one or more corresponding couplers 107 attached to at least one end of each of the conduits 105 to form fluid-tight seals between the conduits 105.

The air system 100 can comprise a supply source 130 (e.g., a compressed air tank) coupled to a supply line 132.

The supply source 130 can be arranged to introduce a quantity of high compressed air to the supply line 132 until each of the plurality of conduits 105 are pressurized to a first pressure (e.g., approximately 100 psi). This, in turn, operates to pressure test each of the couplers associated with the conduits 105 to ensure each coupling is tightly sealed. In other embodiments, the supply source 130 can also be configured to supply other inert gases or materials based on design and specification requirements. Although not shown in FIG. 2, a plurality of flow control and monitoring devices can be arranged in the supply line 132 to maintain and monitor parameters such as air flow and pressure. Additionally, a vacuum system 104, which can comprise a vacuum pump 140 coupled to a vacuum line 142, can be arranged to supply an amount of vacuum (i.e., negative pressure) to remove the supplied air from the plurality of conduits 105. A bleed outlet 103 having a plurality of bleed valves can be arranged in system 100 to bleed air from conduits 105 as it is being filled with hydraulic oil.

The hydraulic circuit 106 can comprise a hydraulic pump device 158 arranged in fluid communication with a reservoir 165 (e.g., a hydraulic fluid tank) to supply a hydraulic fluid to one or more hydraulic lines 162. In some embodiments, the hydraulic pump device 158 can comprise a hydraulic pump 160 coupled to a pressure regulating device 166. The hydraulic pump can comprise a variable speed pump or other suitable flow devices having adjustable outputs (i.e. flow rate) which are adjustable as a function of the pressure in the hydraulic line 162. The pressure regulating device 166 can comprise a pressure control valve that regulates the output pressure of the hydraulic fluid supplied to the hydraulic line 162 in an operational pressure range between approximately 300 to 3,000 psi.

In other embodiments, the hydraulic circuit 106 can further comprise a control valve or other suitable device that is configured to generate a hydraulic displacement control signal that varies the displacement of the hydraulic pump 160 to controls a flow rate of the hydraulic fluid supplied to the plurality of conduits 105. The control valve can also operate to ensure a system pressure of the hydraulic circuit is maintained at approximately 80 psi.

As depicted in FIG. 2, a pressure monitoring device 164, such as a pressure sensor or pressure transducer, can be arranged to monitor a hydraulic pressure in the hydraulic line 162. For example, the pressure monitoring device 164 can be configured verify the integrity (i.e., sealed connections) of the couplers 107 by monitoring pressure levels within the hydraulic line 162.

Referring now to FIG. 3, as previously discussed, the protection circuit 168 can comprise the protection device 167, which can be coupled to an inlet of a hydraulic actuator 169 and arranged in the hydraulic circuit 106 to enable automatic shut-off of flow into the hydraulic line 162 in the event of a connector failure. For example, the protection device 167 can be configured to inhibit fluid flow to a partially seated coupler in response to a pressure differential across a control orifice exceeding a predetermined threshold (i.e., detection of a leak or failed connection of one or more couplers). In embodiments, the protection device 167 can include, but is not limited to, one or more of the following devices: a velocity fuse, a check valve, a safety valve, an actuator and ball screw, combinations thereof, or other suitable flow inhibiting devices. As depicted, the protection device 167 is arranged to inhibit downstream flow of fluid supplied by the hydraulic pump 160 to the one or more couplers arranged in the conduits 105.

In various embodiments, the electronic control unit 110 can include a programmable circuit, processor, a microcontroller, programmable logic controller, or other suitable processing devices capable of receiving and transmitting data signals. The electronic control unit 110 can be configured to receive input from various sensors (e.g., the pressure monitoring device 164) and generate control signals to control the operations of the various system components such as the hydraulic pump 160, pressure regulating device 166, and other control devices. For example, in some embodiments and as will be discussed with reference to FIG. 4, the electronic control unit 110 can be configured activate the protection device 167 or generate an alert signal for review by an operator on a user interface (not shown) based upon the received pressure readings.

With respect to FIGS. 1-3, it will be appreciated by those skilled in the art that FIGS. 1-3 are not drawn to scale and is for illustrative purposes only to demonstrate exemplary embodiments of the present disclosure. Notably, the structural layout and quantity of the various components can and will vary in other embodiments. For example, as discussed above, in some embodiments, the system 100 can optionally comprise one or more pressure sensors. Additionally, in other embodiments, the system 100 can comprise a variety of valve arrangements and hydraulic circuitry based on design and/or application requirements.

Figure 4:
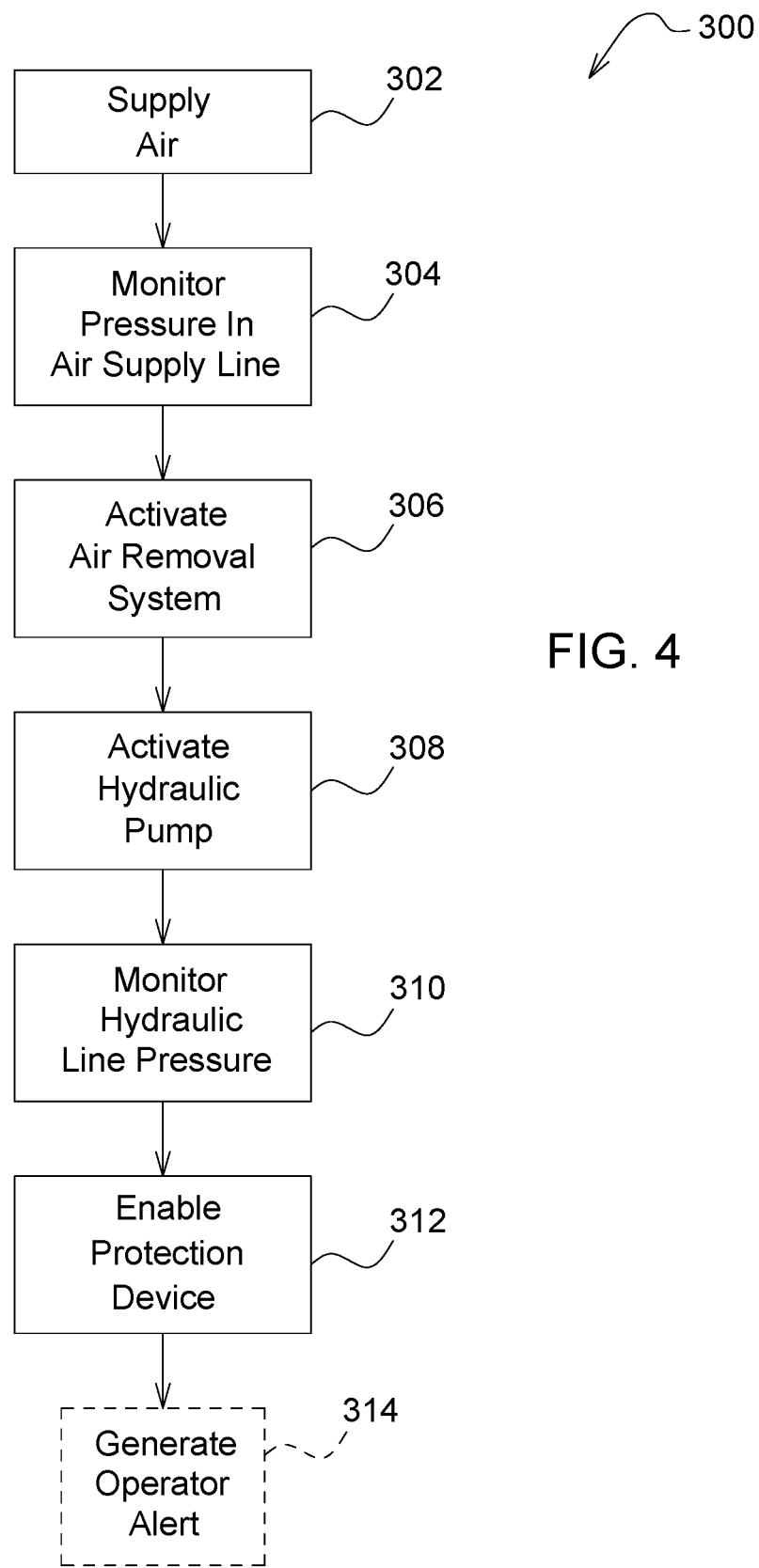
FIG. 4 is a flow diagram of a method for detecting a connector failure.

Referring to FIG. 4, a flow diagram of a method 300 for detecting a connector failure in an agricultural apparatus is shown. At 302, the compressed air received from the supply source 130 is supplied to the plurality of conduits 105 arranged on or proximate the agricultural apparatus 108 to pressurize the hydraulic circuit 106 a first pressure of approximately 100 psi. Next at 304, pressure in the supply line 132 is monitored to ensure each of the couplers 107 arranged in the conduits 105 are properly seated and full connections are made. Once the initial pressure is verified, the vacuum pump 140 of the vacuum system 104 is enabled at 306 via the electronic control unit 110 to remove the compressed air from the hydraulic line (i.e., plurality of conduits 105) before it is filled with hydraulic fluid. Following air removal, the hydraulic pump 160 is activated at 308 to supply pressurized hydraulic fluid to the plurality of conduits 105 at a predetermined pressure. As fluid is introduced into the plurality of conduits 105, an output signal from the pressure monitoring device 164 is transmitted to the electronic control unit 110 and compared with a reference value the pressure within the hydraulic line 162 does not exceed the air pressure set point of 100 psi at 310. the output flow rate of the hydraulic pump 160. At 312, if a pressure spike is sensed (i.e., if a pressure differential exceeds a predetermined amount), the protection device 167 is activated. Once the protection device 167 is activated, the fluid flow in the hydraulic line 162 is substantially inhibited until protection device 167 is manually or electrically reset via an operator input or based on a timed reset of the protection device 167. This, in turn, greatly reduces or stops the flow of hydraulic fluid through the hydraulic line 162. The detected spike can be indicative of a failed connection or other potential failure (e.g., erosion, cracking, or breaking) associated with the one or more couplers 107.

In other embodiments, the electronic control unit 100 can be configured to activate the protection device 167 in response to a detected pressure increase sensed by the monitoring device 164, and an operator alert can be optionally generated at 314. In still other embodiments, the electronic control unit can be configured to initiate an automatic shut-off control scheme to disable one or more functions of the agricultural apparatus when the second pressure measured by the monitoring device 164 exceeds a predetermined threshold.

Without in any way limiting the scope, interpretation, or application of the claims appearing below, a technical effect of one or more of the example embodiments disclosed herein is a system and method for detecting a connector failure in a hydraulic fluid line associated with an agricultural apparatus. The present disclosure is particularly advantageous in that it greatly reduces the amount of oil that is released in the event of a system leak.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A system for detecting a connector failure associated with an agricultural apparatus, the system comprising:
   a first supply source configured to supply a quantity of air into a hydraulic fluid line arranged on the agricultural apparatus at a first pressure;
   a second supply source configured to supply a quantity hydraulic fluid to the hydraulic fluid line at a second pressure that is less than the first pressure; and
   at least one protection device coupled to the hydraulic fluid line, wherein the at least one protection device is configured to inhibit flow of the hydraulic fluid supplied by the second supply source when a pressure differential across an inlet of the protection device exceeds a predetermined threshold.

2. The system of claim 1, wherein the second supply source comprises a pressurized source of hydraulic fluid.

3. The system of claim 1, further comprising a monitoring device coupled to the hydraulic fluid line, wherein the monitoring device is configured to monitor the second pressure of the hydraulic fluid line.

4. The system of claim 3, further comprising an electronic control unit communicatively coupled the monitoring device, wherein the electronic control unit is configured to generate an operator alert when the second pressure exceeds a predetermined threshold.

5. The system of claim 3, further comprising an electronic control unit communicatively coupled the monitoring device, wherein the electronic control unit is configured to initiate an automatic shut-off control scheme to disable one or more functions of the agricultural apparatus when the second pressure exceeds a predetermined threshold.

6. The system of claim 1, wherein the at least one protection device comprises one or more of the following: a velocity fuse, a pressure control valve, an actuator device, or combinations thereof.

7. The system of claim 1, wherein the agricultural apparatus comprises an agricultural implement attached to an agricultural vehicle.

8. An agricultural vehicle for detecting a connector failure, the agricultural vehicle comprising:
   a vehicle frame supported by a plurality of ground engaging units;
   an agricultural implement coupled to the vehicle frame;
   a first supply source configured to supply a quantity of air at a first pressure into a hydraulic fluid line arranged on at least one of the vehicle frame or the agricultural implement;
   a second supply source configured to supply a quantity hydraulic fluid to the hydraulic fluid line at a second pressure that is less than the first pressure;
   a monitoring device coupled to the hydraulic fluid line, wherein the monitoring device is configured to monitor the second pressure; and
   an electronic control unit communicatively coupled the monitoring device, wherein the electronic control unit is configured to generate operator alert when the second pressure exceeds a predetermined threshold.

9. The system of claim 8, wherein the second supply source comprises a pressurized source of hydraulic fluid.

10. The system of claim 8, wherein the electronic control unit is further configured to generate a control signal to initiate an automatic shut-off control scheme to disable one or more functions of the agricultural vehicle when the second pressure exceeds a predetermined threshold.

11. The system of claim 8, wherein the at least one protection device comprises one or more of the following: a velocity fuse, a pressure control valve, an actuator device, or combinations thereof.

12. The system of claim 8, wherein the agricultural implement comprises a plurality of planter row units.

13. The system of claim 8, wherein the first supply source comprises an air supply, and wherein the second supply source comprises one or more hydraulic fluid reservoirs.

14. The system of claim 8, wherein the agricultural vehicle comprises at least one of a manned or unmanned vehicle.

15. A method for detecting a connector failure in an agricultural apparatus, the method comprising:
   introducing a first medium to a hydraulic fluid line at a first predetermined pressure;
   introducing a second medium to a hydraulic fluid line at a second predetermined pressure that is less than the first predetermined pressure;
   monitoring a pressure of the hydraulic fluid line as the hydraulic fluid is introduced at the second predetermined pressure; and
   actuating a protection device arranged in the hydraulic fluid line to inhibit flow of the hydraulic fluid when a pressure differential across an inlet of the protection device exceeds a predetermined threshold.

16. The method of claim 15, wherein introducing a first medium comprises introducing a quantity of air from a first supply source, and wherein introducing a second medium comprises a introducing hydraulic fluid from a second supply source.

17. The method of claim 15, wherein the at least one protection device comprises one or more of the following: a velocity fuse, a pressure control valve, an actuator device, or combinations thereof.

18. The method of claim 15, further comprising generating, by an electronic control unit, an operator alert when the second predetermined pressure exceeds a threshold value.

19. The method of claim 15, further comprising disabling, by an electronic control unit, at least one function of the agricultural apparatus when the second predetermined pressure exceeds a threshold value.

20. The method of claim 19, wherein disabling at least one function of the agricultural apparatus comprises prevent movement of the agricultural apparatus and disabling the supply of the second medium from a second supply source.

* * * * *